E. S. ROBINSON.
STEERING AND DRIVING MECHANISM FOR MOTOR VEHICLES.
APPLICATION FILED JULY 19, 1912.
1,092,744.
Patented Apr. 7, 1914.
2 SHEETS—SHEET 1.
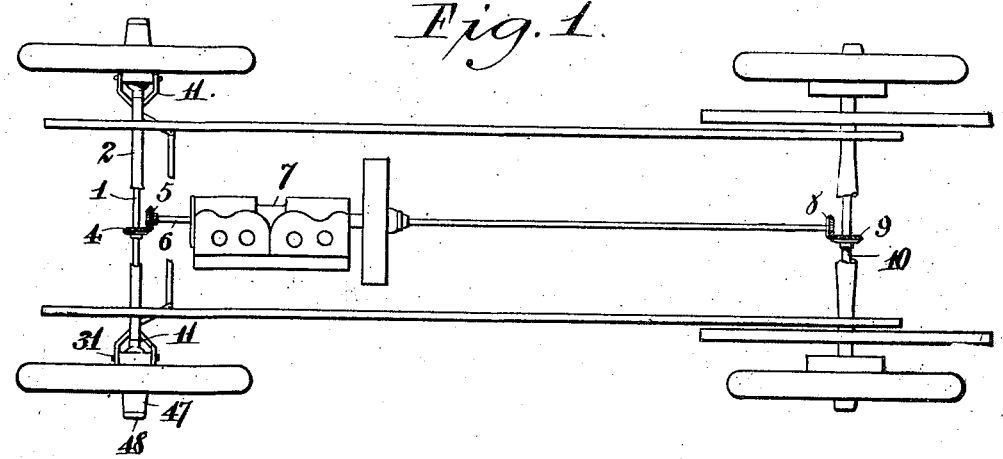
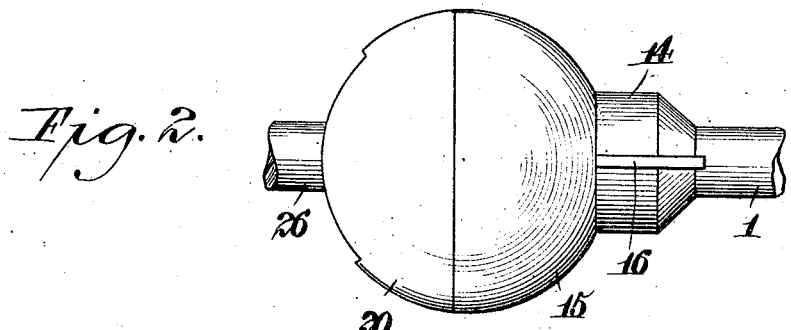
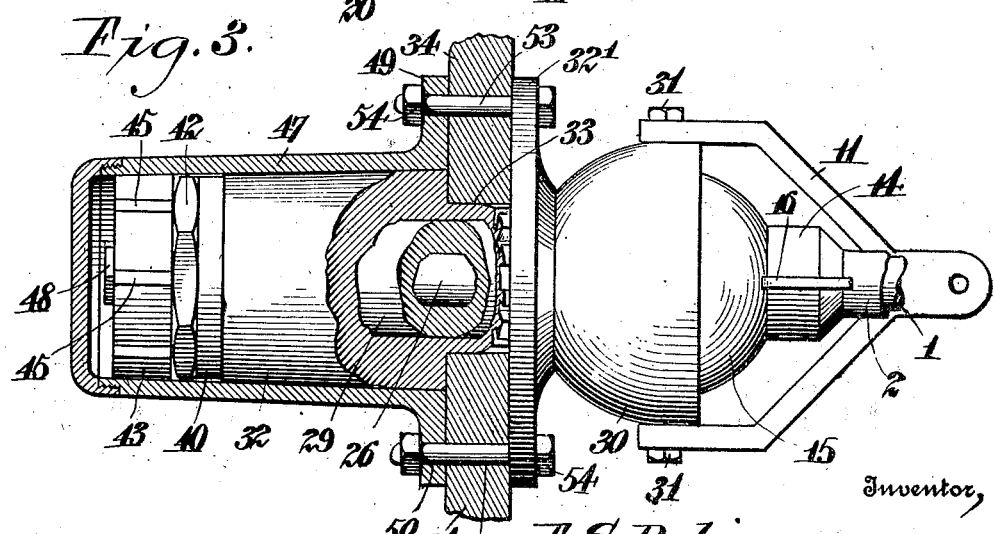
Witnesses:
Christ Feinle, Jr.
Wm. T. North.
Inventor,
E. S. Robinson.
By Victor J. Evans,
Attorney E. S. ROBINSON.
STEERING AND DRIVING MECHANISM FOR MOTOR VEHICLES.
APPLICATION FILED JULY 19, 1912.
1,092,744.
Patented Apr. 7, 1914.
2 SHEETS—SHEET 2.
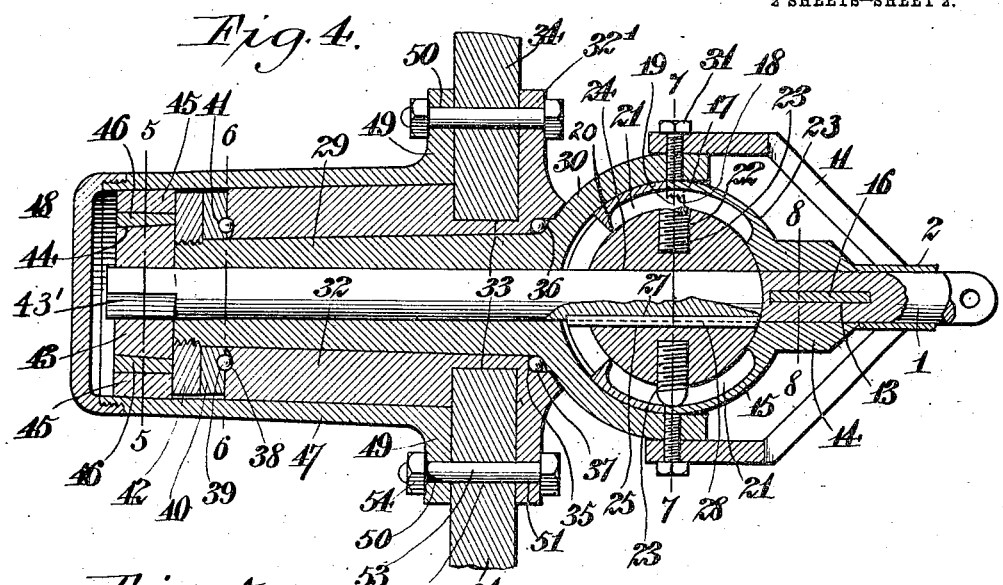
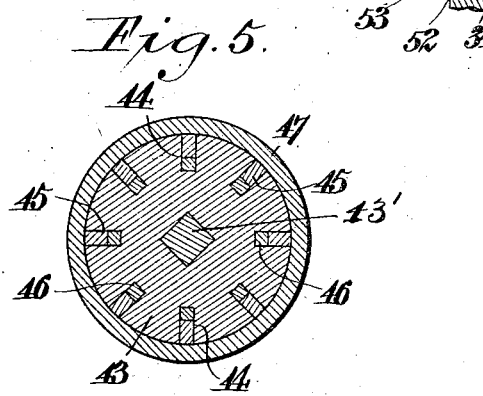
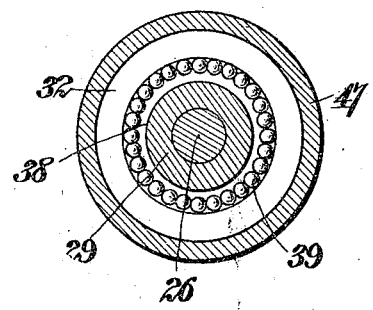
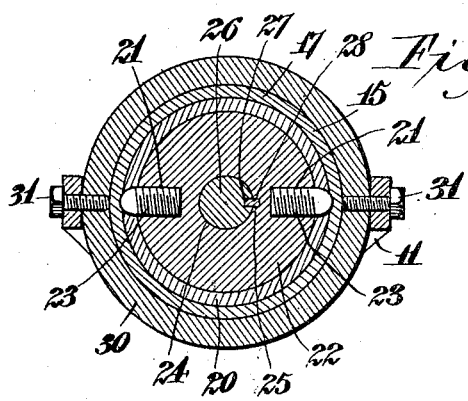
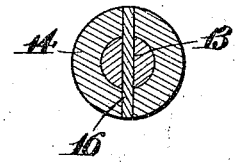
Inventor,
E. S. Robinson.
By Victor J. Evans,
Attorney.
Witnesses:
Christ Feinle, Jr.
Wm. J. North

UNITED STATES PATENT OFFICE.

EDWARD S. ROBINSON, OF OROVILLE, CALIFORNIA, ASSIGNOR TO GOLDEN WEST MOTORS COMPANY, OF SACRAMENTO, CALIFORNIA, A CORPORATION OF CALIFORNIA.

STEERING AND DRIVING MECHANISM FOR MOTOR-VEHICLES.

1,092,744.  Specification of Letters Patent.  Patented Apr. 7, 1914.

Application filed July 19, 1912. Serial No. 710,467.

*To all whom it may concern:*

Be it known that I, EDWARD S. ROBINSON, a citizen of the United States, residing at Oroville, in the county of Butte and State of California, have invented new and useful Improvements in Steering and Driving Mechanism for Motor-Vehicles, of which the following is a specification.

The present invention relates to improvements in driving and steering mechanism.

In carrying out my invention it is my purpose to provide a construction of this class wherein power from the motor may be transmitted to the front wheels of the vehicle as well as to the rear wheels thereof, and wherein more motive power for drawing heavy loads, climbing hills and for other purposes where great draft is needed without increasing the diameter of the tires or the motive power of the vehicle. I further propose to construct a mechanism for this purpose which will embody the desirable features of simplicity, accuracy and durability.

With the above recited objects in view, and others which will appear as the invention is more fully understood, the improvement resides in the novel construction, combination and operative arrangement of parts set forth in the following description and falling within the scope of the appended claims.

In the drawings, Figure 1 is a plan view of the running-gear of a vehicle, showing the steering mechanism. Fig. 2 is an elevation of the rear portion of the knuckle. Fig. 3 is a broken plan view of one knuckle, a portion of the casing being broken away. Fig. 4 is a longitudinal section of most of the parts of the driving gear and of the transmitting mechanism. Fig. 5 is a cross section upon the line 5—5 of Fig. 4. Fig. 6 is a similar sectional view upon the line 6—6 of Fig. 4. Fig. 7 is a sectional view upon the line 7—7 of Fig. 4. Fig. 8 is a section upon the line 8—8 of Fig. 4.

Referring now to the drawings in detail, the numeral 1 designates the front axle or shaft which is mounted in one of the front tubes 2, said tube being fixed against rotation by any suitable means (not shown). A gear wheel 4 may be mounted on the axle 1, to be driven by a gear 5, which is mounted upon a shaft 6 of a motor 7. The said shaft 6 may be extended, if desired, and provided with a gear wheel 8 which will mesh with a similar gear wheel 9 provided upon the rear axle 10 of the vehicle, if the motive power is to be applied to both the front and rear axles. The steering fork 11 is mounted on the tubular casing 2 by any suitable means. This steering fork is operated in the usual manner, and as the operating mechanism is well understood a detailed description, and an illustration of the same is not deemed necessary.

The opposite ends of the shaft 1 are provided with elongated preferably wedge-shaped openings 13, the same adapted to register with similar openings formed in the sleeve 14 of a substantially semi-spherical socket 15. The openings are adapted to receive a wedge 16, whereby the sockets 15 are removably sustained upon the axle, but so as to revolve with said axle. The piece 14 is disposed in continuation of said tube 2. The semi-spherical socket 15 is formed with a reduced portion 17 having interior threads 18, the said threads adapted to co-act with similar threads provided upon a shoulder 19 of the socket extending member 20. The extension 20, as well as the socket 15 are each provided at suitable spaced intervals with registering curved depressions forming pockets 21.

The numeral 22 designates a ball member or sphere which is adapted to be received within the socket 15 and to be retained therein by the socket extension 20. This ball is provided with removable lugs 23 which extend beyond the periphery thereof and which are adapted to be received within the pockets 21 and which, when contacting with the opposite shoulders provided by the said pockets limit the swinging movement of the ball. The ball 22 is provided with a centrally arranged bore 24, and the said ball is further provided with a recess or depression 25 which opens within the bore 24.

The numeral 26 designates a spindle which has one of its ends received within the bore 24 of the ball, and the said spindle has its end provided with a recessed portion 27 which is adapted to register with the recess 26 of the bore, and positioned within the said registering recesses is a spring key 28 which effectively retains the spindle upon the ball. Surrounding the spindle 26 is a sleeve 29 which has one of its extremities cup-shaped as at 30, the said cup-shaped portion being arranged adjacent the socket and its extension, and being adapted to close the open end or mouth of the extension. The steering fork 11 has its arms connected with the said cup-shaped member 30 through the medium of removable elements, such as bolts 31.

The numeral 32 designates the wheel hub, the same comprising a hollow member which surrounds the sleeve 29. The inner portion of the hub is formed with an enlarged annular flange 32', while the hub is formed with depressions or pockets 33 which are arranged in a plane with the outer face of the said flange 32'.

The numerals 34 designate the spokes for the wheel, the said spokes adapted to rest upon the flange 32' and to have their inner ends received within the pockets 33 of the hub.

The hub, at its juncture with the flange 32' is provided with an annular depressed portion 35, the same being arranged diametrically opposite to a curved annular depression 36 formed upon the sleeve 29 at its juncture with its cup-shaped extension 30. The annular recessed portions or depressions 35 and 36 are adapted to provide a race way for anti-frictional balls 37. The outer end of the hub 31 is also provided with an annular depression 38, within which is seated anti-frictional balls 39, the same being retained within the depression 38 through the medium of a bearing plate 40, the inner face of which being also provided with an annular depression 41 which forms one of the members of the race way for the anti-frictional balls 39. The sleeve 29 is provided with exterior threads arranged adjacent its outer end, and co-acting with the said threads is a jam nut 42, which also engages with the plate 40 to sustain the said plate against the anti-frictional balls 39.

The spindle 26 may be square in cross section, or the said spindle may have one of its outer extremities threaded, and arranged upon the said outer extremity which projects a suitable distance beyond the end of the spindle 26 is an annular collar 43, the bore of which being of a shape to engage with the end of the spindle. In this connection it may be stated that the collar may be secured to the sleeve in various other manners if desired. The collar 43 is formed at proper spaced intervals with a plurality of openings 44, the same communicating with the periphery of the collar, and arranged within each of the said openings or pockets are friction wedge members 45.

The numerals 46 designate wedge keys which are adapted to contact with the inner wall provided by the pockets 44, and to bear against the wedge members 45 and to force the said wedge members beyond the periphery of the collar and into frictional contact with the inner bore of a hub casing 47. This casing 47 has its outer end open and threaded, and the numeral 48 designates a flanged dust cap which is provided with interior threads which coöperate with the threads of the hub casing 47, to protect the members arranged within the hub casing. The hub casing 47 has its opposite end provided with an out-turned flange 49, the said flange being provided with spaced openings 50 which are adapted to register with similar openings 51 provided in the flange 32' of the hub 31. These openings are arranged within the path of each of the spokes 34, and each of the said spokes are likewise provided with openings 52, while passing through the said registering openings are securing bolts 53 which are provided with retaining nuts 54.

It will be noted that the cup-shaped extension 30 is held against displacement from the spherical part of socket 15 in the following manner: The ball 24 is held in the socket extension 17 by means of the lugs 23 which have movement in the pockets 21, so that said spindle 26 which is fixedly mounted in said ball is also held in connected relation with said socket extension. The free end of the spindle 26 is polysided as at 43' which polysided part is frictionally engaged by the binding collar 43 as hereinbefore mentioned. Through the instrumentality of the wedge block 45 and the keys 46 the binding collar 43 is frictionally held in rigid contact with both the polysided part 43' of the spindle 26 and the hub casing 47, so that when said spindle 26 revolves said hub casing 47 will obey its movement thereby causing the wheel to revolve and through the instrumentality of the spokes 34 which are seated in the hub 31 causing said hub also to revolve frictionlessly owing to the antifrictional walls 36 and 38 hereinbefore described. The binding collar 43 bearing against the jam nut 42, and the jam nut 42 contacting the ball retaining member 40 holds the hub against displacement while said collar 43 bearing against the sleeve 29 upon which the cup-shaped extension 30 is formed, holds said sleeve 29 against displacement also.

When the steering fork 11 is actuated by any suitable means, the cup-shaped extension 30 will be swiveled upon the socket extension relatively to the reduced portion 17 of the socket 15 and thereupon the hub casing will also swivel and cause the wheel to be steered in the desired direction. As the wheel is steered it also revolves owing to the rotation of the spindle 26 which is caused to rotate by means of the fact that the reduced portion 17 of socket 15, being fixedly secured to the axle 1, is caused to rotate with said axle, irrespective of the swiveling movement of the spindle 26.

Numerous modifications may be resorted to in practice without departing in principle from the essence of my invention as disclosed in the appended claims.

Having thus described the invention, what I claim is:—

1. In combination, an axle, a spindle arranged in alinement with said axle, a spherical member carried by said axle, said spindle projecting into said spherical member, means whereby said spindle may rotate in unison with said axle, a polysided part formed upon the free end of said spindle, a sleeve surrounding said spindle and terminating short of the polysided part, a cup-shaped extension formed upon said sleeve and arranged to swivel upon said spherical member, a hub surrounding the said sleeve, spoke receiving members formed exteriorly around said hub, a hub casing, a ring in said hub casing fitting said polysided part of said spindle, means for expanding said ring to frictionally bind against said polysided part and said hub casing, whereby the latter may be rotated with said spindle, and antifrictional balls interposed between said sleeve and said hub.

2. In combination, a spindle, a polysided part formed upon said spindle, a sleeve surrounding said spindle, means engaging one end of said spindle to rotate it, a hub loosely mounted upon said sleeve, spoke receiving sockets being formed upon said hub, a terminal flange formed upon said hub in one plane with said sockets, a swiveling part formed terminally upon said sleeve and bearing loosely upon said flange, a hub casing, a flange upon said casing coöperating with said other flange to form a side bearing for spokes, said sleeve being screw-threaded at its free end, an annular member engaging said screw threaded end of said sleeve and holding said hub against endwise displacement, a ring contacting said hub in said hub casing, said ring fitting the polysided part of said spindle, means for causing said ring to bind against said polysided part and hub casing, and a cap removably closing the end of said hub casing.

In testimony whereof I affix my signature in presence of two witnesses.

EDWARD S. ROBINSON.

Witnesses:
  E. TUCKER,
  A. F. BELL.